Patented May 27, 1924.

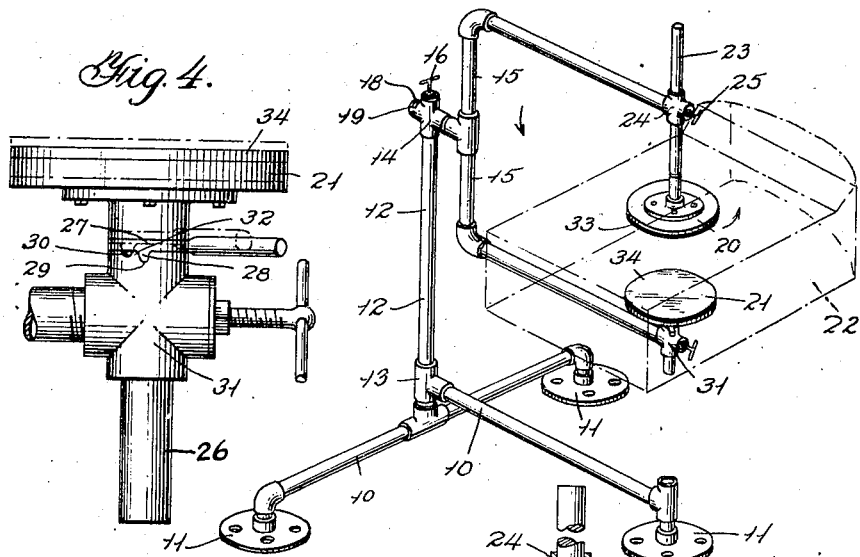
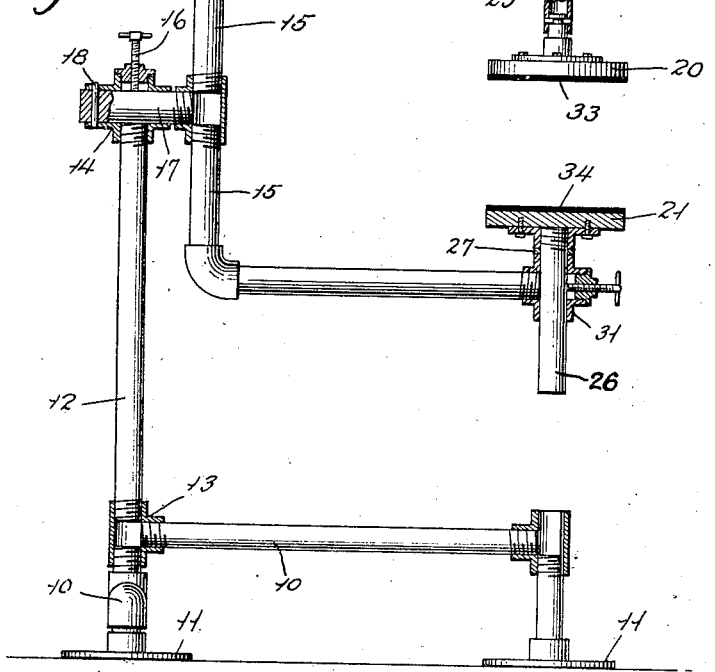
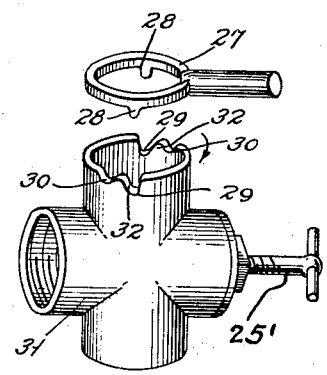

1,495,894

UNITED STATES PATENT OFFICE.

HENRY J. DU BOIS, OF PUTNAM, CONNECTICUT.

AUTOMOBILE RADIATOR REPAIR STAND.

Application filed August 17, 1923. Serial No. 657,969.

*To all whom it may concern:*

Be it known that I, HENRY J. DU BOIS, a citizen of the United States of America, residing at Putnam, in the county of Windham and State of Connecticut, have invented certain new and useful Improvements in Automobile Radiator Repair Stands, of which the following is a specification.

The invention relates to an adjustable stand particularly adapted to support an automobile radiator in any desired position while being constructed or while undergoing repairs.

The principal object of the invention is to provide means for clamping the two flat surfaces of an automobile radiator between two plates which are themselves adjustable and which are adjustably mounted upon two shafts whose axes are in a straight line, the shafts being adjustably mounted in a yoke revolvable about a horizontal axis. The plates, shafts and yoke may be moved to the desired angle and locked in any desired adjusted position. In this manner the radiator having once been secured between the clamping plates may be moved to any desired angle without removing it from the clamp.

An illustrative embodiment of the invention is shown in the accompanying drawings in which:—

Figure 1 is a perspective view of the adjustable radiator repair stand showing a radiator held between the clamping plates.

Figure 2 is a side elevation of the stand, some of the parts being shown in section.

Figure 3 is a detail perspective view on an enlarged scale showing the clamping lever and the notched pipe coupling with which it cooperates.

Figure 4 is a detail elevation view showing the clamping mechanism assembled.

Referring to the drawings, the reference numeral 10 represents a pedestal shown as formed of pipe sections, there being a plurality of flanged supporting feet 11 each of which may be adjusted for height and also angularly, thus enabling the bracket to be used on any floor. The feet are preferably rigidly secured to the floor or other base by means of screws or like fastenings.

Supported by the bracket 10 is a vertical post 12 preferably adjustably secured to the bracket by a threaded T coupling 13. At the upper portion of the post 12 is a coupling 14 in which is mounted a yoke 15 which is adapted to support the radiator or other object which is to be repaired.

The yoke 15 is generally clamped in a substantially vertical plane in any suitable manner as by means of a screw 16 which engages a short horizontal post 17 carried by the yoke. When the screw 16 is loosened the entire yoke may be revolved about a horizontal axis. Pin 18 is secured to post 17 at the outer edge of coupling 14 to prevent port 17 and yoke 15 from pulling out of coupling 14, but yoke 15 and post as a unit is allowed to turn about a horizontal axis at all times except when locked by screw 16, thus allowing the radiator to be turned from rear side up to front side up. Preferably this movement is limited as by means of a pin 18 secured to the post 17, its ends extending through a slot 19 in the pipe coupling 14.

Carried by the yoke 15 are a pair of plates 20 and 21 between which are clamped the radiator 22 or other object upon which work is being done.

As shown, the upper plate 20 is revolubly mounted upon a shaft 23 which may be adjusted vertically in the coupling 24 at the end of the upper arm of the yoke 15. The shaft may be secured in any desired adjusted position by means of a set screw 25.

The lower plate 21 is preferably fixed to its shaft 26 but may be given a slight vertical adjustment by means of a clamping and locking lever 27.

The radiator 22 is first placed between the plates 20 and 21 and the plate 20 lowered until it contacts with the upper surface of the radiator. The upper plate is then locked in this position by means of the set screw 25. The radiator is now locked in position by turning the clamp 27, which is provided with lugs 28 adapted to fit into one of two sets of notches 29, 30, formed in the coupling member 31 secured to the lower arm of the yoke 15. When the clamp is turned about a quarter revolution in the direction of the arrow shown in Fig. 3 the lugs 28 follow the cam surface 32 thus raising the plate 21 and forcing it against the lower face of the radiator 22. The lugs then rest in the so-called locking notches 30.

To remove the radiator from the clamp it is only necessary to release the screw 25 which holds the shaft 23 and plate 20. The clamping lever may then be turned in a counter clockwise direction thus lowering the plate 21 and engaging the lugs 28 in the notches 29, known as the releasing notches.

Preferably plates 20 and 21 are provided with surface pads 33, 34 of rubber or other suitable material which prevent marring the work clamped between the plates.

It will be observed that with the improved radiator repair stand a radiator or the like may be clamped by the two flat surfaces of its core between two plates which are allowed to revolve or to be locked at the will of the repairman, the two plates being pivoted to two shafts whose axes are in a straight line, these shafts being held in a yoke which may itself be revolved or locked in an adjusted position. This construction enables the radiator to be placed at any desired angle without removing it from the clamp.

The invention has been described in great detail for the purpose of illustration, but it is obvious that many changes may be made without departing from the spirit of the invention.

What I claim is:

1. An automobile radiator repair stand comprising a bracket, a vertical post supported on said bracket, a yoke carried by said post and adjustable relative thereto about a horizontal axis, a pair of clamping plates carried by said yoke and adapted to support an automobile radiator, said plates being mounted upon shafts adjustable vertically and rotatable relative to said yoke, and means for locking said shafts in position for clamping the radiator between said plates.

2. In a device of the character described in combination, a yoke angularly adjustable about a horizontal axis, said yoke having upper and lower arms, a pair of axially alined shafts one supported by the upper and the other by the lower arm of said yoke, plates carried by said shafts, means permitting adjustment of the upper shaft vertically through a large extent and clamping means for raising the lower plate through a limited distance whereby an automobile radiator or the like is clamped between the said plates.

3. In a device of the character described in combination, a yoke angularly adjustable about a horizontal axis, said yoke having upper and lower arms, a pipe coupling carried by each of said arms, shafts carried by said couplings having alined axes, and clamping plates carried by said shafts, adapted to support between them an automobile radiator or the like, one of said plates being rotatable relative to its supporting shaft.

In testimony whereof I affix my signature.

HENRY J. DU BOIS.